United States Patent [19]
Goldstein

[11] Patent Number: 5,395,585
[45] Date of Patent: Mar. 7, 1995

[54] METHOD FOR CONTROLLING ODOR

[75] Inventor: Joel M. Goldstein, Ambler, Pa.

[73] Assignee: Aquarium Pharmaceuticals, Inc., Chalfont, Pa.

[21] Appl. No.: 4,878

[22] Filed: Jan. 19, 1993

Related U.S. Application Data

[60] Continuation-in-part of Ser. No. 696,689, May 7, 1991, Pat. No. 5,211,872, which is a division of Ser. No. 557,252, Jul. 24, 1990, Pat. No. 5,082,573.

[51] Int. Cl.$^6$ ............................................. A61L 9/01
[52] U.S. Cl. ................................... 422/5; 210/749; 210/916; 424/76.6; 424/76.7
[58] Field of Search ............... 119/1, 3; 210/716, 719, 210/729, 749, 750, 757, 753–756, 903, 908, 916; 422/5; 424/76.5, 76.6, 76.7

[56] References Cited

U.S. PATENT DOCUMENTS

| | | | |
|---|---|---|---|
| 2,315,734 | 4/1943 | Ralston et al. | 210/23 |
| 2,960,535 | 11/1960 | Bylsma | 260/567.6 |
| 3,079,340 | 2/1963 | Reamer | 252/33.6 |
| 3,080,315 | 3/1963 | Silvey | 210/62 |
| 3,208,936 | 9/1965 | Hamilton | 422/5 |
| 3,446,733 | 5/1969 | Shell | 210/749 |
| 3,706,663 | 12/1972 | Peterson | 422/5 |
| 3,960,649 | 6/1976 | Sullivan | 162/72 |
| 4,007,262 | 2/1977 | Bowers | 424/76.6 |
| 4,019,859 | 4/1977 | Lavin et al. | 21/2.7 R |
| 4,082,683 | 4/1978 | Galesloot | 252/105 |
| 4,239,622 | 12/1980 | Ridgway | 424/130 |
| 4,313,827 | 2/1982 | Ratigan et al. | 210/136 |
| 4,317,813 | 3/1982 | Ridgway | 424/130 |
| 4,364,835 | 12/1982 | Cheh | 210/752 |
| 4,666,610 | 5/1987 | Kuhns | 210/749 |
| 4,676,912 | 6/1987 | Eckler | 210/708 |
| 4,786,434 | 11/1988 | Gunter | 252/181 |
| 4,909,986 | 3/1990 | Kobayashi et al. | 422/5 |
| 4,968,496 | 11/1990 | Rohe et al. | 424/76.7 |
| 5,009,887 | 4/1991 | Iwahashi | 422/5 |
| 5,039,481 | 8/1991 | Pacifici et al. | 422/5 |
| 5,049,297 | 9/1991 | Morris et al. | 252/80 |
| 5,082,573 | 1/1992 | Goldstein et al. | 210/749 |

FOREIGN PATENT DOCUMENTS

| | | | |
|---|---|---|---|
| 63-141642 | 6/1988 | Japan | 422/5 |
| WO81/02891 | 10/1981 | WIPO | 422/5 |

OTHER PUBLICATIONS

International Search Report for International Application No. PCT/US91/05153.

DuPont Advertising Sheet No. H10436 entitled "Branch Out And Try DYTEK® A In Your Next Formulation".

DuPont Petrochemicals Technical Bulletin No. E-84603 (Apr. 1987) entitled "DYTEK ™ A As Epoxy Curing Agent".

*Primary Examiner*—Peter A. Hruskoci
*Attorney, Agent, or Firm*—Panitch Schwarze Jacobs & Nadel

[57] ABSTRACT

The present method for deodorizing ammonia odor in an ammonia-containing environment includes adding to the environment a non-toxic, aqueous, acidified amine-based ammonia deodorizing composition in an amount effective to deodorize the ammonia odor in the environment. In addition, a method for preparing the ammonia deodorizing compositions and the compositions produced thereby is disclosed.

11 Claims, No Drawings

METHOD FOR CONTROLLING ODOR

RELATED APPLICATIONS

This is a continuation-in-part application of U.S. patent application Ser. No. 07/696,689, filed May 7, 1991, now U.S. Pat. No. 5,211,872, which was a division of U.S. patent application Ser. No. 07/557,252, filed Jul. 24, 1990, now U.S. Pat. No. 5,082,573.

FIELD OF THE INVENTION

The present invention relates to a method for controlling odors, particularly those caused by ammonia. In addition, the present invention is directed to a method for preparing an odor-controlling composition and the composition produced thereby.

BACKGROUND OF THE INVENTION

It is known in the biological arts that urea is excreted by animals as a result of normal animal metabolism and is rapidly converted into ammonia by biological action, primarily bacterial action. In aquatic systems, fish and other aquatic animal life excrete urea directly into the water, where it is rapidly converted into ammonia. Non-aquatic animals also excrete urea into natural habitats and, especially domestic animals, into artificial habitats, such as stalls, coops, cages, litter pans and other indoor and outdoor structures. In addition, urea excretion may be found in restrooms, sidewalks and other public places due to human misuse as well as domestic animals. Ammonia is also produced as a result of the decay of solid animal waste and uneaten food.

If allowed to build up, ammonia reaches toxic levels, causing sickness and death of animal life. Ammonia is an environmental contaminant deadly to animal life and produces a potent, generally noxious odor. For this reason, it is desired to remove, neutralize or otherwise deodorize ammonia in animal environments to detoxify these contaminants, so that such environments are safe and odor free.

As used herein with respect to the present invention, "deodorize" means to control or reduce the odor of ammonia to a level at which ammonia odor is not offensive and preferably not perceptible, regardless of the chemical, biological or biochemical mechanism causing the ammonia odor.

Conventional methods for controlling ammonia odors include the use of fragrance laden compounds to mask the ammonia odors and the use of zeolite, activated carbon or other minerals or materials having high surface area or an ability to adsorb fluids or gases. These adsorbents typically take the form of loose chips, granules or powder with which the ammonia must be contacted. Such methods work by adsorbing ammonia or ammonia-producing compounds, inhibiting release of noxious odors and facilitating removal of the adsorbed compounds along with the zeolite or similar material. One example of such a method is the use of animal litter formed of zeolite or clay granules. Such methods, however, are generally inconvenient and inefficient because the zeolite or similar compound chips, granules or powders are messy to handle and must be added to a confined container to be generally effective. In addition, zeolites and similar materials have a limited adsorption capacity and relatively large quantities, which are bulky and heavy, must be used. Moreover, especially where chips or granules are used, odor causing compounds may not efficiently permeate and contact or be adsorbed by the zeolite or similar material.

In view of the deficiencies and inefficiencies of the prior art, it is desirable to have a method for controlling odors, particularly ammonia odor, that is safe, non-toxic, easy to use and is capable of keeping animal environments substantially odor free for an extended period of time.

SUMMARY OF THE INVENTION

According to the present invention, a method for controlling odor in an ammonia odor-containing environment comprises adding to the environment a non-toxic aqueous acidified amine-based deodorizing composition in an amount effective to deodorize the ammonia odor in the system.

Further, the present invention is directed to a method of preparing a stable, non-toxic aqueous composition for controlling odors in ammonia odor-containing environments comprising the steps of mixing an amine-based compound with water to form a solution and acidifying the amine-based compound in the solution to form a reaction mixture such that the solution has a pH suitable for ammonia odor control which minimizes toxicity of the solution to plant and animal life.

DETAILED DESCRIPTION OF PREFERRED EMBODIMENTS

The present invention is directed to a method for controlling odors, particularly ammonia odor in ammonia odor-containing environments. Such environments include closed and open environments which are naturally occurring or man-made including, but not limited to, animal litter, animal litter containers, cages, crates, stalls, coops, restrooms and other environments where ammonia may occur.

In accordance with the present invention, odors are controlled in an ammonia odor-containing environment by adding to the environment an amine-based ammonia deodorizing solution in an amount effective to deodorize the ammonia odor in the environment. The amount of the amine-based ammonia deodorizer necessary to deodorize the ammonia odor will vary depending on the amount of ammonia present in the environment.

The amine-based ammonia deodorizing solution comprises an amine-based ammonia deodorizing compound, sometimes referred to hereinafter as an "amine-based compound." For purposes of this disclosure, an amine-based ammonia deodorizing compound is a compound containing at least one functional amine group, and which, when the amine-based compound is acidified to a pH safe for animal life, is capable of neutralizing and/or reacting with ammonia present in an environment to effectively deodorize the ammonia in the environment. Preferably, the amine-based ammonia deodorizing compound is selected from the group consisting of alkanolamines, aliphatic amines and polyamines (i.e., alkylamines and arylamines having more than one and typically more than two functional amine groups).

According to the present invention, the acidified amine-based compound is essentially non-toxic to plant and animal life, including domestic and farm animals. The acidified amine-based compound must be non-toxic to plant and animal life when present in an environment in an amount sufficient to deodorize the quantity of ammonia odor desired (discussed below). Moreover, it is preferred that the acidified amine-based compound be non-toxic to life when present in amounts substantially greater than (e.g., three to twenty times) the amount required to deodorize ammonia present in an environment to minimize any danger to life if the acidified amine-based compound is accidentally added to the environment in an amount exceeding the desired amount.

Specific examples of amine-based compounds suitable for use in accordance with the present invention include alkanolamines, such as monoethanolamine, diethanolamine and triethanolamine, aliphatic amines and polyamines, such as 1,3-diaminopentane (DAP), 2-methyl pentamethylene diamine (MPMD), triethylene tetramine (TETA) and diethylene triamine (DETA). One skilled in the art will appreciate in view of the present disclosure, however, that other alkanolamines, aliphatic amines and polyamines may be used in accordance with the present invention. The presently preferred amine-based compounds are MPMD and DAP.

Preferably, the acidified amine-based compound is present in an aqueous solution in an amount up to about the saturation point of the acidified amine-based compound in the solution. The saturation point of a given acidified amine-based compound may be readily determined by reference to published solubility tables or routine experimentation. The appropriate amount of acidified amine-based compound to use in the deodorizing solution is determined by balancing economics and the effectiveness of deodorizing the ammonia odor in the environment, and can be readily determined based on the disclosure herein without undue experimentation. It is preferred that the acidified amine-based ammonia deodorizing compound be present in the solution in an amount of about 5% to about 50% by weight of the solution. Where MPMD is used as the amine-based compound in the present method, for example, it is presently preferred that the compound is present in the solution in an amount of about 26% by weight.

Other additives, such as dispersants, surfactants, perfumes, coloring agents, etc., which do not adversely affect the deodorizing function of the amine-based compound, may also be present in the solution where desired.

Because of the presence of the functional amine groups on the amine-based compound, it will be appreciated that the pH of the solution containing the amine-based compound will be relatively high or basic. The amine-based compound is acidified to form a salt of the amine-based compound having a lower pH than the amine-based compound itself. By lowering the pH, the toxicity of the compound is accordingly reduced. The amine-based compound is preferably acidified to a pH of about 5.5 to about 8.5, for example. One of ordinary skill in the art may readily determine the desired pH depending on the optimum pH of the particular environment to be treated using the method of present invention.

In accordance with the present invention, the acidified amine-based ammonia deodorizing solution is added to an environment in an amount effective to deodorize the estimated or anticipated amount of ammonia odor in the environment. Generally, the deodorizing solution of the present invention is added to the environment as a diluted aqueous solution, hereinafter referred to as a "working solution." For example, the deodorizing solution of the present invention, which contains about 5% to about 50% of the acidified amine-based deodorizing compound, may be diluted with a suitable solvent, preferably water, in an amount of about 190 ml to about 1900 ml per gallon of water. The working solution may then be applied directly to the environment to be deodorized. The working solution may be applied on environmental surfaces or into environmental substrates (e.g., animal litters, earth, etc.) in spray form or applied with a mop, for example, or may be manufactured into or associated with certain surfaces and substrates, such as cage board.

It is presently preferred to apply the working solution to the environment to be deodorized in an amount sufficient to wet or coat the area with the solution until the portion of the environment contacted with the working solution is damp. The environment need not be soaked or saturated with the working solution or the acidified amine-based compound. One skilled in the art will readily understand, in view of this disclosure, the amount of working solution necessary to deodorize an ammonia-containing environment will depend upon the size of the area to be deodorized, the composition of the substrate to be contacted with the solution, such as hard wood, tile, concrete, or carpeted floors, or walls, or ceilings or other components of structures, clay, metal, cageboard, zeolite, etc., the amount of ammonia estimated or anticipated in the environment, the concentration of the working solution and the ammonia deodorizing capacity of the particular acidified amine-based compound used, among other factors. For example, where deodorizing solution is added to animal litter, such as a zeolite, the high surface area and high adsorptivity of the zeolite generally requires a relatively larger amount of the working solution with mixing of the litter to fully cover or coat the available surface area of the litter.

Application of the deodorizing solution may be repeated as frequently as needed, but it is believed that one application to a typical ammonia odor-containing environment, such as an animal litter container, should, even after the solution in the environment has dried, deodorize and keep the environment ammonia odor free for at least about one week. For example, one presently preferred deodorizing solution comprises about 26% by weight MPMD, with a pH of about 7.0. About 20 ml of such a working solution (at a concentration of 1900 ml deodorizing solution per gallon of water) is sufficient to deodorize about 1 lb. of a typical clay litter for cats.

The aqueous amine-based ammonia deodorizing composition according to the present invention may be prepared by adding the amine-based compound to water or an aqueous solution and acidifying the solution to the desired pH, for example. Acidification of the solution may be performed using any organic or inorganic acid that is safe and non-toxic to life when used in the amount necessary to acidify the solution to the desired pH. The acid may be added to the amine-based compound in solution in monitored amounts using conventional methods and apparatus for acid addition or titration and pH testing until the desired pH is achieved.

The acid chosen should not react with the amine-based compound to form toxic or otherwise dangerous products. Suitable acids for acidifying the amine-based ammonia detoxifying compound and solution include hydrochloric acid (HCl), sulfuric acid ($H_2SO_4$), acetic acid ($CH_3COOH$) and phosphoric acid ($H_3PO_4$). It is presently preferred to use a dilute aqueous solution of hydrochloric acid when the amine-based compound is a polyamine, such as MPMD, to minimize the quantity of heat generated during acidification. Hydrochloric acid is also presently preferred to acidify the solution when the amine-based compound comprises an alkanolamine.

The theory by which the acidified amine-based ammonia deodorizing solution acts to deodorize ammonia is currently unknown. Regardless of the theory or mechanism of action or reaction, however, the present invention produces surprising and unexpected results; namely, the composition and method of using the composition of the present invention effectively and continuously deodorize ammonia in an ammonia-containing environment for a period of several days to several weeks, as opposed to less effective, conventional prior art methods and compositions in which ammonia is masked or deodorized in environments for only a comparatively short period of time after addition of the prior art compositions to the system.

The present invention will now be illustrated in further detail by reference to the following specific, non-limiting example.

EXAMPLE

One hundred milliliters (100 ml) of 2-methyl pentamethylene diamine (MPMD) was mixed for about 10 minutes with 100 ml of water to form a solution at room temperature. This solution was acidified with 400 ml of an aqueous solution of 15 wt % HCl to a pH of 7.0. The resulting working solution has about 16 wt % MPMD. The working solution was applied to "AMMO-CAT" ® clay litter supplied by the assignee of the present invention using a spray bottle until the litter was uniformly dampened (about 20 ml of working solution per pound of litter). The treated clay litter was placed in a conventional litter box and used by house cats and dogs under typical household usage conditions. The odor of ammonia emanating from the litter box was noticeable only after 14 to 16 days of use. In contrast, a control solution prepared in a similar manner to the working solution but without the MPMD produced a noticeable smell after only 4 to 6 days when similarly tested.

The present invention may be embodied in other specific forms without departing from the spirit or essential attributes thereof and, accordingly, reference should be made to the appended claims, rather than the specification, as indicating the scope of the invention.

I claim:

1. A method for deodorizing ammonia odor in an ammonia odor-containing non-aquatic environment, comprising applying to a surface or substrate in contact with the non-aquatic environment a non-toxic aqueous acidified amine-based ammonia deodorizing composition in an amount effective to deodorize the ammonia odor in the non-aquatic environment, wherein the ammonia deodorizing composition comprises an amine-based compound having at least one functional amine group selected from the group consisting of an alkanolamine, aliphatic amine and polyamine, the acidified amine-based ammonia deodorizing composition being acidified to a pH which is non-toxic to plant and animal life.

2. The method according to claim 1, wherein the amine-based compound is selected from the group consisting of monoethanolamine, diethanolamine, triethanolamine, 2-methyl pentamethylene diamine, 1,3-diaminopentane, triethylene tetramine and diethylene triamine.

3. The method according to claim 2, wherein the amine-based compound is 2-methyl pentamethylene diamine.

4. The method according to claim 1, wherein the pH of the composition is about 5.5 to about 8.5.

5. The method according to claim 1, wherein the acidified amine-based compound is present in the deodorizing composition in an aqueous solution in an amount of up to the saturation point of the acidified amine-based compound in the solution.

6. The method according to claim 5, wherein the acidified amine-based compound is present in the deodorizing composition in an amount of about 5% to about 50% by weight.

7. The method according to claim 5, wherein the acidified amine-based compound is present in the deodorizing composition in an amount of about 16% by weight.

8. The method according to claim 1, wherein the composition is added to the environment in a diluted working solution comprising solvent and about 190 ml to about 1900 ml of the deodorizing composition per gallon of solvent.

9. The method according to claim 8, wherein the solvent is water.

10. The method according to claim 9, wherein the working solution having a concentration of about 1900 ml per gallon of solvent is added to the environment.

11. The method according to claim 1, wherein about 26% by weight of 2-methyl pentamethylene diamine present in a deodorizing composition having a pH of about 7.0 is added to an ammonia-containing environment in a working solution comprising about 1900 ml of the deodorizing composition per gallon of water to deodorize substantially all of the ammonia.

* * * * *